US012756744B2

(12) United States Patent
Low et al.

(10) Patent No.: US 12,756,744 B2
(45) Date of Patent: Oct. 6, 2026

(54) METHOD TO DEFINE AN ENFORCEABLE GENERIC SECURITY POLICY AND APPLY IT USING CLOUD-SPECIFIC SECURITY CONSTRUCTS

(71) Applicant: Dell Products L.P., Round Rock, TX (US)

(72) Inventors: Chooi Peng Low, Plano, TX (US); Shoham Levy, Ra'anana (IL); Michal Davidson, Beit Shemesh (IL)

(73) Assignee: Dell Products L.P., Round Rock, TX (US)

( * ) Notice: Subject to any disclaimer, the term of this patent is extended or adjusted under 35 U.S.C. 154(b) by 57 days.

(21) Appl. No.: 18/639,832

(22) Filed: Apr. 18, 2024

(65) Prior Publication Data

US 2025/0330497 A1 Oct. 23, 2025

(51) Int. Cl.
*H04L 29/06* (2006.01)
*H04L 9/40* (2022.01)

(52) U.S. Cl.
CPC .................................... *H04L 63/20* (2013.01)

(58) Field of Classification Search
CPC ....................................................... H04L 63/20
See application file for complete search history.

(56) References Cited

U.S. PATENT DOCUMENTS

2021/0144141 A1* 5/2021 Lee ........................ H04L 9/0897
2021/0367980 A1* 11/2021 Kossey ................. H04L 63/205
2023/0097662 A1* 3/2023 Martinez ................. G06F 21/44 718/100
2024/0045964 A1* 2/2024 Bednash ............... G06F 21/566
2024/0388606 A1* 11/2024 Mihajlovic ........... H04L 47/125

OTHER PUBLICATIONS

APEX Navigator Multicloud Management Experience—Dell USA. https://www.dell.com/en-us/dt/apex/storage/public-cloud/navigator.htm#scroll=off&tab0=0.

* cited by examiner

*Primary Examiner* — Evans Desrosiers
(74) *Attorney, Agent, or Firm* — Workman Nydegger

(57) ABSTRACT

One example method includes receiving, from a client, generic security requirements concerning a cloud system, generating a generic security policy based on the generic security requirements, mapping the generic security policy to cloud-specific constructs to define a cloud-specific deployment security architecture, implementing the cloud-specific deployment security architecture at a cloud site, enabling the client to deploy the cloud system at the cloud site, and using the cloud-specific deployment security architecture to enforce the generic security policy during deployment of the cloud system.

16 Claims, 4 Drawing Sheets

METHOD TO DEFINE AN ENFORCEABLE GENERIC SECURITY POLICY AND APPLY IT USING CLOUD-SPECIFIC SECURITY CONSTRUCTS

TECHNOLOGICAL FIELD OF THE DISCLOSURE

Embodiments disclosed herein generally relate to implementation of security measures in cloud environments. More particularly, at least some embodiments relate to systems, hardware, software, computer-readable media, and methods, for the definition and use of a generic security policy that can be applied across multiple different platforms by different users with user-specific security requirements.

BACKGROUND

When deploying a distributed software defined storage system on the public cloud, a user is typically not familiar with the underlying Cloud Solution Platform (CSP) specific security constructs. The user also has no way to enforce security standards such as Zero Trust requirements, during cloud deployment, and in a uniform way across multiple CSPs.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
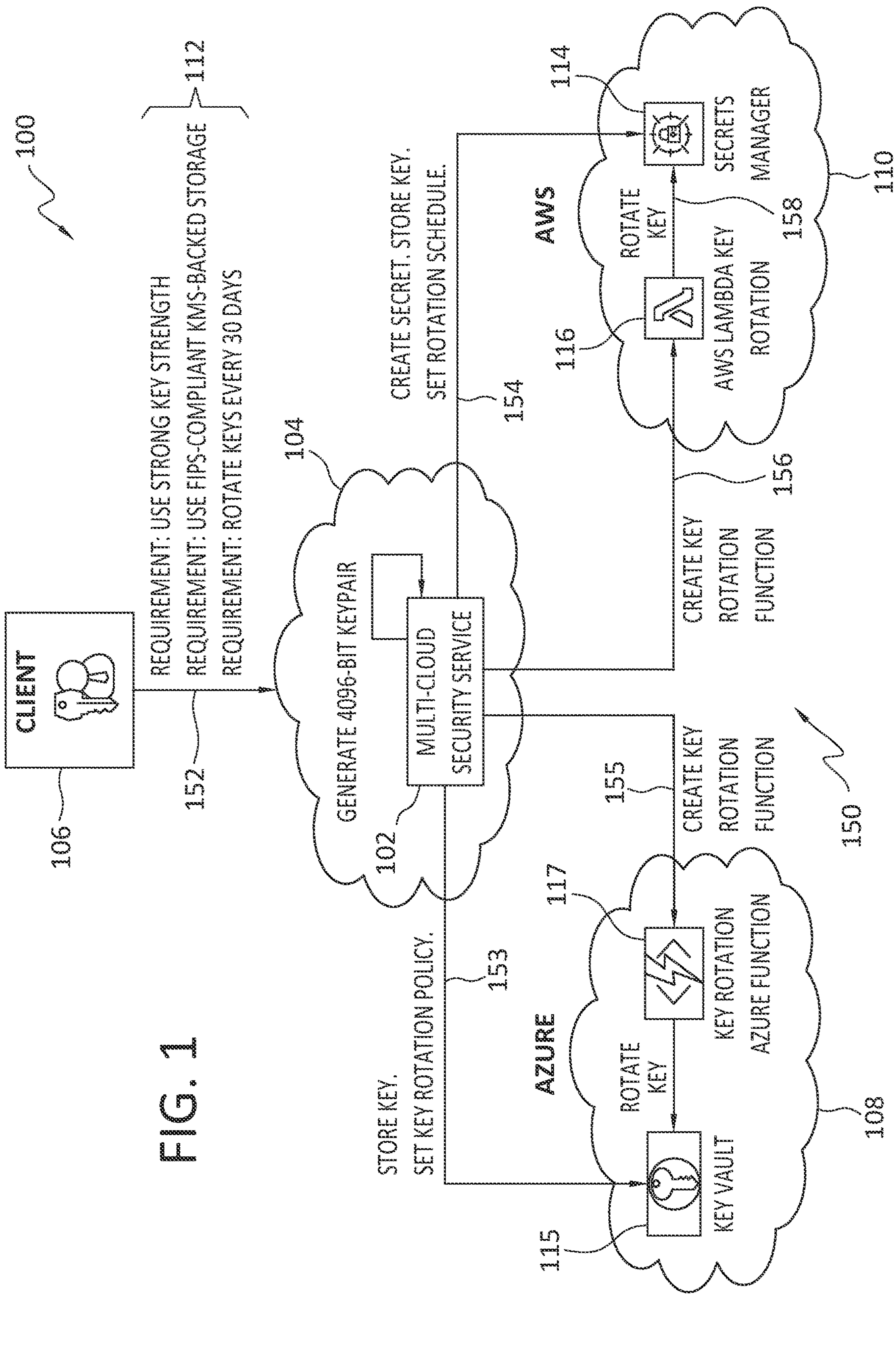
FIG. 1 discloses aspects of a method and architecture for translating client key management requirements into cloud specific implementations, according to one example embodiment.

Embodiments disclosed herein generally relate to implementation of security measures in cloud environments. More particularly, at least some embodiments relate to systems, hardware, software, computer-readable media, and methods, for the definition and use of a generic security policy that can be applied across multiple different platforms by different users with user-specific security requirements.

One example embodiment comprises a method for defining an enforceable generic security policy and applying the generic security policy using cloud-specific security constructs. One embodiment of such a method comprises operations including: receiving, from a user, generic security requirements concerning a cloud deployment planned by the user; performing a cloud specific conversion of the generic security requirements; constructing a cloud specific security architecture according to the cloud specific conversion; deploying a software defined storage system of the user; and, enforcing security requirements of the cloud specific security architecture when the software defined storage system is deployed.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect is that an embodiment may enable a user to deploy a storage system in a cloud environment without the user having to know, or be aware of, any underlying cloud-specific security requirements. An embodiment may enable a user to deploy a cloud security-compliant storage system by specifying only generic security requirements for the deployment. An embodiment may enable a user to enforce user security standards across multiple cloud platforms. Various other advantages of one or more example embodiments will be apparent from this disclosure.

A. Aspects of an Example Operating Environment for One Embodiment

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, data protection, data storage, and data retrieval, operations. More generally, the scope of this disclosure embraces any operating environment in which the disclosed concepts may be useful.

At least some embodiments provide for the implementation of the disclosed functionality in software defined storage systems and backup platforms, examples of which include the Dell APEX platform and associated backup software, and storage environments. In general, however, the scope of this disclosure is not limited to any particular data backup platform or data storage environment.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud environments in connection with which embodiments may be employed include, but are not limited to, Microsoft Azure, Amazon AWS, Dell EMC Cloud Storage Services, Google Cloud, and any other CSP (cloud solution platform). More generally however, the scope of this disclosure is not limited to employment of any particular type or implementation of a cloud environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

Finally, as used herein, the term 'data' is intended to be broad in scope. As such, example embodiments are applicable to any system capable of storing and handling various types of objects, in analog, digital, or other form.

B. Overview of Aspects of an Example Embodiment

One example embodiment comprises a method of mapping generic security requirements into CSP (cloud solution platform) specific cloud security constructs, and enforcing those requirements at deployment time. As used herein, a CSP may comprise, but is not limited to, a cloud storage platform, and a cloud computing platform. This example method may be used to map generic security compliance requirements such as Zero Trust (ZT) requirements into CSP-specific security constructs, and ensure the enforcement of those requirements at deployment time, that is, at the time a client, customer, or user, deploys their system on a public cloud. In an embodiment, one such system comprises a distributed software-defined storage system.

In an embodiment, the method, which may be performed by a multi-cloud security service, receives, as input, generic security requirements, for example, encryption required, secret generation required, secret protection required, key pair generation required, secure tamper proof ID required. These generic security requirements may be provided by a user or client, for example, to a multi-cloud security service.

Using the generic security requirements, the method may, in an embodiment, perform a cloud specific conversion to the CSP specific security constructs, for example, calculating tradeoffs per topology, where tradeoffs can be defined as cost, security, and performance limitation. These tradeoffs may then be used to make decisions when performing the cloud specific conversion, for example by allowing customers to input their prioritization of tradeoffs, such as cost, or performance, or highest level security. Based on this tradeoff information, an embodiment may then make a decision as to how to perform the cloud specific conversion. For example, if a customer prefers cost as a higher or highest priority, a software based key management solution such as AWS KMS (key management system) may be selected, and if a customer prefers highest security, an HSM (hardware security module) may be selected, despite the higher cost.

Next, a cloud specific deployment security architecture can then be constructed according to the generic security requirements, using advanced cloud security constructs which are CSP specific such as, but not limited to, Key Management Service (KMS), Secrets Manager, SSH-KeyGen, for example. This supports enforcing compliance to Zero Trust requirements at deployment time instead of after the fact, enabling cohesion across CSPs, with enforcement of Zero Trust requirements such as, but not limited to, deploying security audits and SIEM (security information and event management) integration, deploying CSPM (cloud security posture management) tools, FIPS (federal information processing standards) compliance, and network security improvements.

In contrast with one embodiment, there are currently no known solutions for automated selection of cloud specific security constructs on a public cloud which perform a translation of generic security requirements to cloud specific security constructs, and then enforces those security requirements at deployment time. For example, it is typically the case that a CSPs each use different respective terminology and paradigms for deploying and managing its cloud security infrastructure and services. There is no standardization of terminology, paradigms, or security infrastructure and services, in the public cloud domain. Moreover, and notwithstanding the difficulties resulting from such a lack of standardization, there is industry acceptance of this cloud vendor specific divergence such that a move toward standardization, as implemented by an example embodiment, would be counterintuitive in the present environment. Thus, and in contrast with an embodiment, there is no approach which uses a generic approach to security and applies this to the public cloud in order to automate cloud security decisions and deployments using the cloud specific advanced security constructs.

An embodiment may be able to support deployments to multiple CSPs. Each of these CSPs may have their own respective security constructs. Notwithstanding, an embodiment may enable such deployments to multiple CSPs using a single unified architecture and a single cloud neutral API. Thus, as used herein, 'generic' security requirements embrace security requirements that are not specific to, or uniquely determined by, any particular CSP(s). That is, a generic security requirement may be generally applicable across CSPs of various different types, configurations, and requirements.

C. Detailed Discussion of Examples of an Embodiment

In one example use case, an embodiment may be employed in connection with a Dell PowerFlex Software Defined Storage deployment on AWS (Amazon Web Services) CSP. During deployment orchestration by APEX navigator, an SSH key pair may be created per virtual machine (VM). The private key of the SSH key pair may then be passed to PowerFlex instances, and the private key may also be stored for customer access.

C.1 Key Management in Various Environments

With reference now to the example of FIG. 1, an architecture 100, and corresponding method 150, according to one embodiment, are disclosed. In this example, the architecture 100 comprises a multi-cloud security service (MCSS) 102 that may be hosted in a cloud environment 104 that is able to communicate with one or more clients 106. The multi-cloud security service 102 may, in turn, communicate with one or more CSPs 108 and 110, such as MS Azure and Amazon AWS, respectively. These example CSPs 108 and 110 may have different respective security requirements and procedures, and the MCSS 102 and client(s) 106 may operate accordingly.

As shown in FIG. 1, the method 150 may begin when the client 106 provides 152, as input to the MCSS 102, various security requirements 112 relating to a deployment that the client has targeted for one or more of the CSPs 108 and 110. The MCSS 102 may then map the security requirements 112 to generic security requirements, and the MCSS 102 may then map those generic security requirements to a CSP specific application using CSP specific security constructs. Example CSP specific applications, to which one or more generic security requirements may be mapped, are discussed below.

For example, and with reference to the AWS use case referred to in FIG. 1, the AWS SSH-KeyGen may be used by the MCSS 102 to create 154 an SSH Key Pair. The AWS Secrets Manager 114 may be used to store the private key, where the private key is protected by encryption with a KMS key under the hood, and is accessible to customers with the preset roles.

As further indicated in FIG. 1, the MCSS 102 may also create 156 a key rotation function, which may be created based on the security requirements 112 specified by the client 106. The key rotation function may be configured, for example, to rotate the keys periodically, such as every 30 days for example, to further enhance the security of the keys. In an embodiment, the key rotation function may be performed 158 by AWS Lambda 116.

With continued attention to FIG. 1, an embodiment may operate similarly with respect to MS Azure, deployed at CSP 108, as with respect to the AWS use case discussed above. For example, the MCSS 102 may create and store 153 a secret, namely, a key. In an embodiment, the process 153 may also comprise the setting, by the MCSS 102, of a key rotation policy. The key may be stored in an Azure Key Vault 115. As well, the MCSS 102 may create 155 a key rotation function that may be propagated to an Azure key rotation module 117 that operates to execute the key rotation function.

It is noted that the CSPs 108 and 110 of FIG. 1 are presented only by way of example. In an embodiment, more, or fewer, CSPs may be involved. Further, a CSP is not limited to any particular platform or vendor.

C.2 Zero Trust (ZT) Environments

Figure 2:
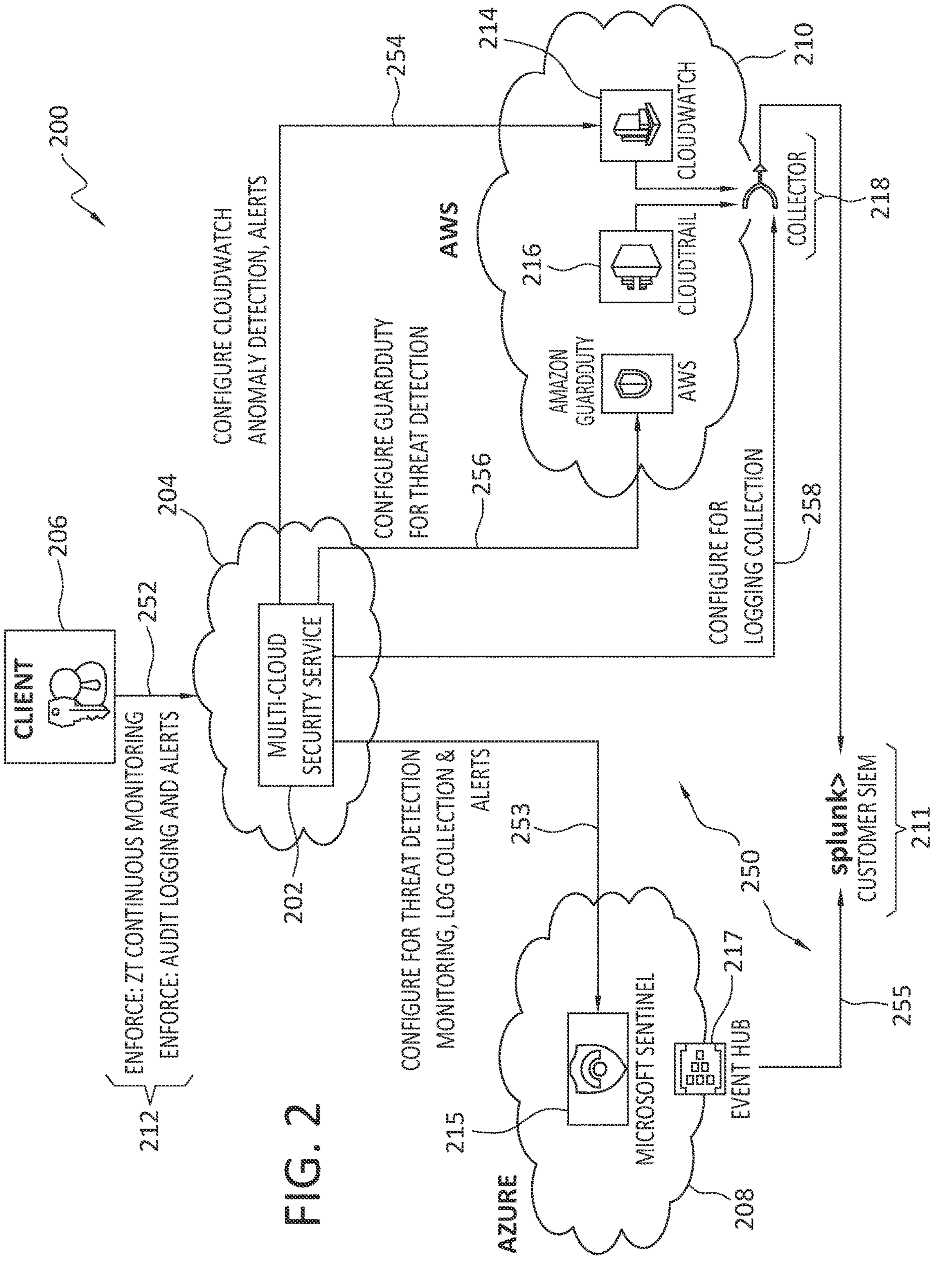
FIG. 2 discloses aspects of a method and architecture for translating client security requirements into cloud specific implementations, according to one example embodiment.

With reference now to the example of FIG. 2, an architecture 200, and corresponding method 250, according to one embodiment, are disclosed. In this example, the architecture 200 comprises a multi-cloud security service (MCSS) 202 that may be hosted in a cloud environment 204 that is able to communicate with one or more clients 206. The multi-cloud security service 202 may, in turn, communicate with one or more CSPs 208 and 210, such as MS Azure and Amazon AWS, respectively. These example CSPs 208 and 210 may have different respective security requirements and procedures, and the MCSS 202 and client(s) 206 may operate accordingly. Finally, the CSPs 208 and 210 may communicate with a customer SIEM module 211.

As shown in FIG. 2, the method 250 may begin when the client 206 provides 252, as input to the MCSS 202, various ZT and other requirements 212 relating to a deployment, such as software defined storage for example, that the client has targeted for one or more of the CSPs 208 and 210. The MCSS 202 may then map the ZT and other requirements 212 to generic security requirements, and the MCSS 202 may then map those generic security requirements to a CSP specific application using CSP specific security constructs. Example CSP specific applications, to which one or more generic security requirements may be mapped, are discussed below.

In one use case, an embodiment comprises a Dell PowerFlex Software Defined Storage deployment on the CSP 208 and on the CSP 210. During deployment orchestration by the Dell APEX navigator, Zero Trust requirements 212 mapped to CSP specific applications may be enforced. Security audit logging and ZT continuous monitoring, as indicated at the requirements 212, are included in the Zero Trust posture, in this example embodiment.

In more detail, and with reference to the example AWS use case of FIG. 2, the MCSS 202 may convert the ZT and other requirements 212 to CSP specific constructs, to be applied during deployment time. As part of this configuration process, the MCSS 202 may, for example, configure 254 an AWS CloudWatch anomaly detection function and associated alerts. This configuration may be implemented by way of the AWS CloudWatch function 214, which may, along with the AWS CloudTrail function 216, output alerts to a collector module 218. Among other things, the AWS CloudTrail function 216 may record, and audit, AWS account activity, and the AWS CloudTrail function 214 enables the monitoring of calls made to the AWS CloudWatch API (application program interface).

As part of the mapping of the generic security requirements 212 using CSP specific security constructs, the MCSS 202 may also configure 256 the GuardDuty module 218. Finally, the MCSS 202 may configure 258 the collector 218 for collection and logging of the outputs of the CloudTrail module 216 and the CloudWatch module 214. The information that has been collected and logged may then be passed by the collector 218 to the customer SIEM module 211. In this way, the client 206 may be able to obtain information concerning events that have taken place in the CSP 210.

With continued reference to the example of FIG. 2, the MCSS 202 may also map generic security requirements to MS (Microsoft) Azure specific constructs. For example, the MCSS 202 may configure 253, and/or provide information for configuring, MS Sentinel 215 and Azure EventHub 217. Thus configured, and similar to the CloudTrail module 216 and the CloudWatch module 214, the MS Sentinel 215 and/or Azure EventHub 217 may pass 255 information concerning events in the CSP 208 to the customer SIEM module 211.

In an embodiment, various enhancements may be implemented with respect to the embodiment of FIG. 1 and/or the embodiment of FIG. 2. For example, a default, such as per user/global, security best practices, may be implemented with respect to one or more CSPs. As another example, an embodiment may build EL1 compliance rules in to a CSP-specific configuration, or as a default.

D. Example Methods

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 3:
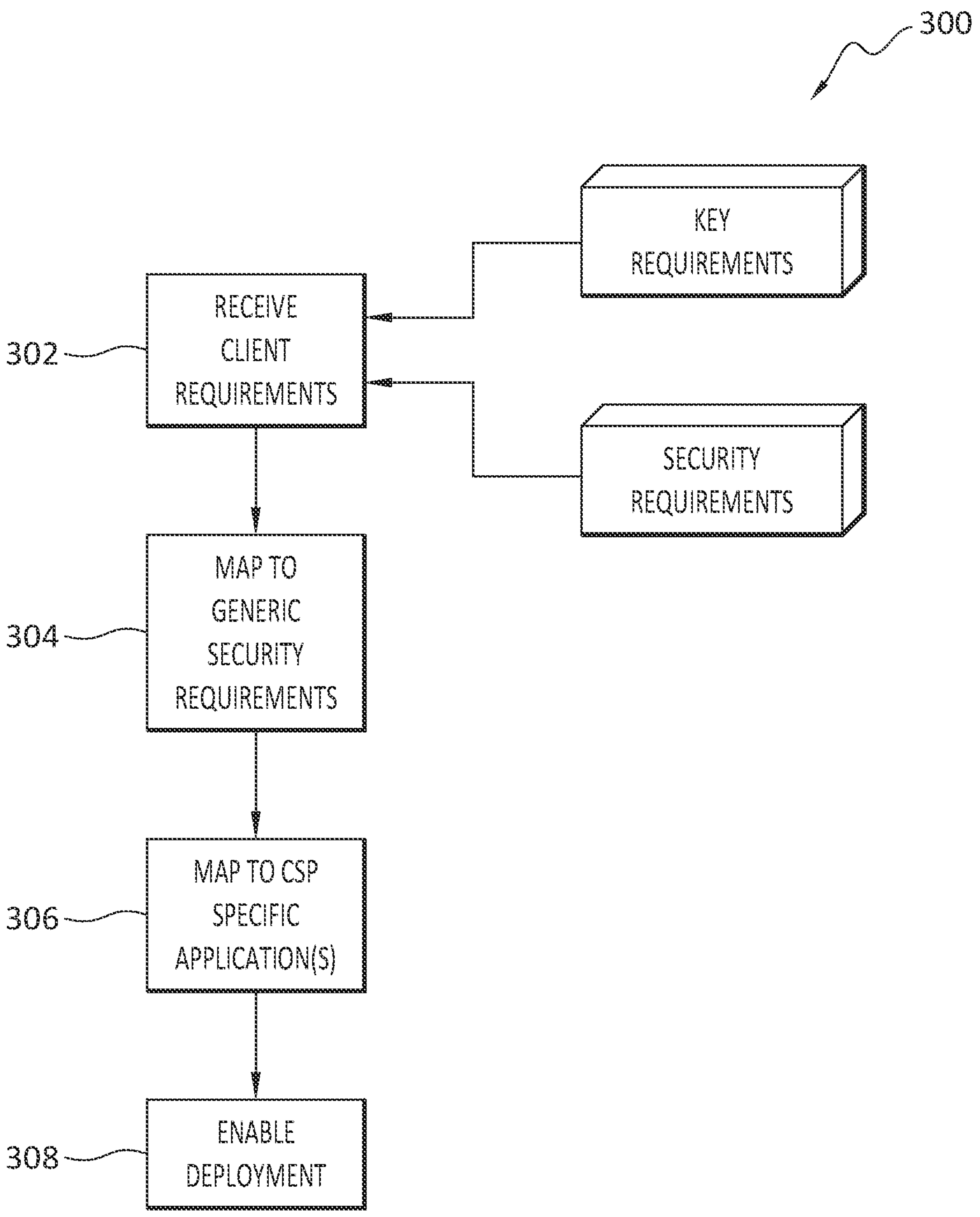
FIG. 3 discloses a method according to one embodiment.

Directing attention now to FIG. 3, a method 300 according to one embodiment is disclosed. In one embodiment, the method 300 may be performed in whole, or in part, by an MCSS, example embodiments of which are disclosed herein.

The method 300 may begin when an MCSS receives 302 various client requirements. In an embodiment, the client requirements may be expressed in plain language, such as English, when input to the MCSS. The client requirements may comprise, but are not limited to, requirements concerning keys, and requirements concerning security procedures.

The client requirements may then be mapped 304 by the MCSS to generic security requirements. After the mapping 304 has been performed, the generic security requirements may then be mapped 306 to specific respective applications at one or more CSPs. This mapping 306 may comprise sending commands and data/metadata to the CSPs to enable the CSPs to configure themselves. Additionally, or alternatively, the mapping 306 may comprise the MCSS itself configuring the applications and other structures of the CSPs.

In an embodiment, the generic security requirements may be received 302 directly from the client. These generic security requirements may then be mapped 306 to CSP specific applications. Thus, in this embodiment, there is no need for the mapping 304 and that operation may accordingly be omitted.

After the mapping 306 has been completed, deployment of the client system/application to the CSP(s) is enabled 308. In an embodiment, the MCSS may automatically deploy the client system/application to the CSP(s) after the deployment has been enabled 308. Alternatively, the MCSS may notify the client that deployment has been enabled, and may then wait for a command from the client to implement the deployment. After the deployment has been completed, the CSP(s) may then run their respective applications, which may comprise cloud computing applications and/or cloud data storage applications for example, according to the key and security requirements upon which the deployment was based.

E. Further Example Embodiments

Following are some further example embodiments. These are presented only by way of example and are not intended to limit the scope of this disclosure or the claims in any way.

Embodiment 1. A method, comprising: receiving, from a client, generic security requirements concerning a cloud system; generating a generic security policy based on the generic security requirements; mapping the generic security policy to cloud-specific constructs to define a cloud-specific deployment security architecture; implementing the cloud-specific deployment security architecture at a cloud site; enabling the client to deploy the cloud system at the cloud site; and using the cloud-specific deployment security architecture to enforce the generic security policy during deployment of the cloud system.

Embodiment 2. The method as recited in any preceding embodiment, wherein the generic security requirements comprise requirements concerning access key creation and usage.

Embodiment 3. The method as recited in any preceding embodiment, wherein the cloud system comprises a distributed software defined storage system.

Embodiment 4. The method as recited in any preceding embodiment, wherein the cloud system comprises a distributed cloud computing system.

Embodiment 5. The method as recited in any preceding embodiment, wherein the enforceable generic security policy is configured to be implemented and enforced at another cloud site that comprises other cloud-specific constructs that are different from the cloud-specific constructs of the cloud site.

Embodiment 6. The method as recited in any preceding embodiment, wherein the generating, the mapping, and the implementing, are performed by a multi-cloud security service configured to communicate with one or more other cloud sites.

Embodiment 7. The method as recited in any preceding embodiment, wherein the generic security requirements comprise zero trust requirements.

Embodiment 8. The method as recited in any preceding embodiment, wherein mapping the generic security policy to cloud-specific constructs to define a cloud-specific deployment security architecture comprises generating and storing a key.

Embodiment 9. The method as recited in any preceding embodiment, wherein mapping the generic security policy to cloud-specific constructs to define a cloud-specific deployment security architecture comprises creating, and deploying to the cloud site, a key rotation function.

Embodiment 10. The method as recited in any preceding embodiment, wherein mapping the generic security policy to cloud-specific constructs to define a cloud-specific deployment security architecture comprises configuring the cloud site to perform threat detection.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 4:
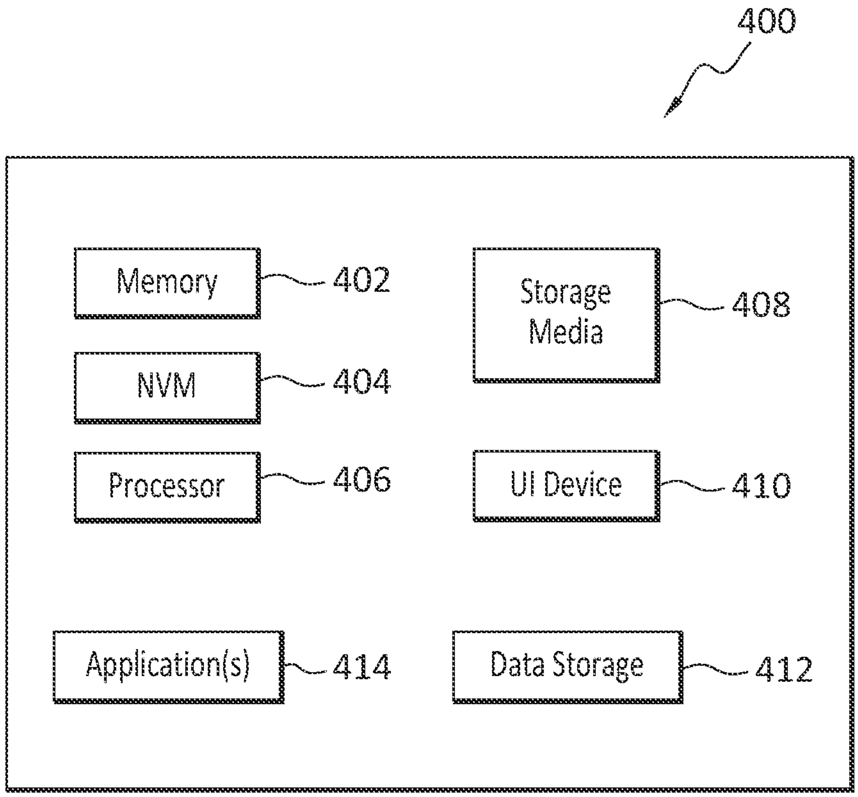
FIG. 4 discloses an example computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method, comprising:

in connection with an existing cloud site, receiving, from a client, generic security requirements concerning a cloud system that is to be deployed to the existing cloud site;

generating, by a multi-cloud security service, a generic security policy based on the generic security requirements, wherein the generic security policy is independent of any particular cloud service provider and the generic security requirements comprise requirements concerning access key creation and usage;

mapping the generic security policy to cloud-specific constructs of the existing cloud site by:

determining a plurality of candidate cloud-specific security constructs supported by the existing cloud site based on the generic security policy, and selecting, from the plurality of candidate cloud-specific security constructs, a set of cloud-specific constructs based on one or more constraints comprising at least one of security level, cost, or performance;

defining, based on the selected set of cloud-specific constructs, a cloud-specific deployment security architecture that is compliant with established security requirements of the existing cloud site, wherein defining the cloud-specific deployment architecture includes creating, and deploying to the cloud site, a key rotation function;

implementing the cloud-specific deployment security architecture at the existing cloud site;

automatically enforcing the generic security policy during deployment of the cloud system by configuring the existing cloud site using the selected set of cloud-specific constructs;

enabling the client to deploy the cloud system at the existing cloud site without requiring the client to specify the cloud-specific constructs.

2. The method as recited in claim 1, wherein the cloud system comprises a distributed software defined storage system.

3. The method as recited in claim 1, wherein the cloud system comprises a distributed cloud computing system.

4. The method as recited in claim 1, wherein the enforceable generic security policy is configured to be implemented and enforced at another cloud site that comprises other cloud-specific constructs that are different from the cloud-specific constructs of the cloud site.

5. The method as recited in claim 1, wherein the generating, the mapping, and the implementing, are performed by a multi-cloud security service configured to communicate with one or more other cloud sites.

6. The method as recited in claim 1, wherein the generic security requirements comprise zero trust requirements.

7. The method as recited in claim 1, wherein mapping the generic security policy to cloud-specific constructs to define a cloud-specific deployment security architecture comprises generating and storing a key.

8. The method as recited in claim 1, wherein mapping the generic security policy to cloud-specific constructs to define a cloud-specific deployment security architecture comprises configuring the cloud site to perform threat detection.

9. A non-transitory storage medium having stored therein instructions that are executable by one or more hardware processors to perform operations comprising:

in connection with an existing cloud site, receiving, from a client, generic security requirements concerning a cloud system that is to be deployed to the existing cloud site;

generating, by a multi-cloud security service, a generic security policy based on the generic security requirements, wherein the generic security policy is independent of any particular cloud service provider and the generic security requirements comprise requirements concerning access key creation and usage;

mapping the generic security policy to cloud-specific constructs of the existing cloud site by:

determining a plurality of candidate cloud-specific security constructs supported by the existing cloud site based on the generic security policy, and selecting, from the plurality of candidate cloud-specific security constructs, a set of cloud-specific constructs based on one or more constraints comprising at least one of security level, cost, or performance;

defining, based on the selected set of cloud-specific constructs, a cloud-specific deployment security architecture that is compliant with established security requirements of the existing cloud site, wherein defining the cloud-specific deployment architecture includes creating, and deploying to the cloud site, a key rotation function;

implementing the cloud-specific deployment security architecture at the existing cloud site;

automatically enforcing the generic security policy during deployment of the cloud system by configuring the existing cloud site using the selected set of cloud-specific constructs;

enabling the client to deploy the cloud system at the existing cloud site without requiring the client to specify the cloud-specific constructs.

10. The non-transitory storage medium as recited in claim 9, wherein the cloud system comprises a distributed software defined storage system.

11. The non-transitory storage medium as recited in claim 9, wherein the cloud system comprises a distributed cloud computing system.

12. The non-transitory storage medium as recited in claim 9, wherein the enforceable generic security policy is configured to be implemented and enforced at another cloud site that comprises other cloud-specific constructs that are different from the cloud-specific constructs of the cloud site.

13. The non-transitory storage medium as recited in claim 9, wherein the generating, the mapping, and the implementing, are performed by a multi-cloud security service configured to communicate with one or more other cloud sites.

14. The non-transitory storage medium as recited in claim 9, wherein the generic security requirements comprise zero trust requirements.

15. The non-transitory storage medium as recited in claim 9, wherein mapping the generic security policy to cloud-specific constructs to define a cloud-specific deployment security architecture comprises generating and storing a key.

16. The non-transitory storage medium as recited in claim 9, wherein mapping the generic security policy to cloud-specific constructs to define a cloud-specific deployment security architecture comprises configuring the cloud site to perform threat detection.

* * * * *